US012780149B2

(12) United States Patent
Matiyow

(10) Patent No.: US 12,780,149 B2
(45) Date of Patent: Nov. 3, 2026

(54) VEHICLE WIPER AND WASHER ACTUATION SYSTEM

(71) Applicant: Scott Jason Matiyow, Tallahassee, FL (US)

(72) Inventor: Scott Jason Matiyow, Tallahassee, FL (US)

( * ) Notice: Subject to any disclaimer, the term of this patent is extended or adjusted under 35 U.S.C. 154(b) by 508 days.

(21) Appl. No.: 17/751,746

(22) Filed: May 24, 2022

(65) Prior Publication Data

US 2023/0382351 A1 Nov. 30, 2023

(51) Int. Cl.

*B60S 1/08* (2006.01)
*B60K 35/10* (2024.01)
*B60K 35/20* (2024.01)
*B60S 1/46* (2006.01)

(52) U.S. Cl.

CPC ................ *B60S 1/08* (2013.01); *B60K 35/10* (2024.01); *B60K 35/20* (2024.01); *B60S 1/46* (2013.01)

(58) Field of Classification Search

CPC ... B60S 1/08; B60S 1/46; B60S 1/482; B60K 2360/573; B60K 2360/797; B60K 35/10
See application file for complete search history.

(56) References Cited

U.S. PATENT DOCUMENTS 5,581,058 A * 12/1996 Javery .................. B60Q 1/1476 200/61.54
6,153,995 A * 11/2000 Tanaka ................. G01N 21/552 318/483
6,164,564 A * 12/2000 Franco ...................... B60S 1/52 239/284.1
7,304,443 B2 * 12/2007 Argo ....................... B60S 1/481 318/16
8,843,270 B2 * 9/2014 Kwon ................... B60S 1/0807 701/49
9,227,568 B1 * 1/2016 Hubbell ................ B60R 16/023
9,707,935 B1 * 7/2017 Singer ...................... B60S 1/528
11,770,677 B1 * 9/2023 Lesesky .................. H04W 4/48 455/456.1
11,772,607 B1 * 10/2023 Venterosa ............. B60S 1/3413 15/250.001
11,919,463 B1 * 3/2024 Medina ............... B60R 16/0373
2002/0137455 A1 * 9/2002 Ivanov .................... B60S 1/482 454/157
2005/0039969 A1 * 2/2005 Laukkanen ............ B60K 35/10 180/333
2006/0220598 A1 * 10/2006 Argo ....................... B60S 1/481 318/446
2006/0244563 A1 * 11/2006 Koyama .................. H01C 7/02 338/111
2008/0277466 A1 * 11/2008 Dohm .................... G06Q 10/06 235/382
2009/0254219 A1 * 10/2009 Willey .................. B60S 1/0818 700/275

(Continued)

*Primary Examiner* — Kenny Nguyen
(74) *Attorney, Agent, or Firm* — J. Wiley Horton

(57) ABSTRACT

A vehicle windshield wiper and washer activation system that allows the control of these devices from outside the vehicle. A remote switch or switches is provided at a convenient location, such as the side of the fender or in front of the grill. An optional wireless connection may also be provided. In the wireless embodiment, a separate actuating device such as a dedicated transmitter or smartphone is used to control the wipers and the delivery of washer fluid.

19 Claims, 9 Drawing Sheets

(56) References Cited

U.S. PATENT DOCUMENTS

| | | | | |
|---|---|---|---|---|
| 2013/0319486 | A1* | 12/2013 | Kikuta | B60S 1/50<br>134/123 |
| 2016/0347286 | A1* | 12/2016 | Tousignant | B60S 1/524 |
| 2018/0334140 | A1* | 11/2018 | Ghannam | B60S 1/52 |
| 2019/0070963 | A1* | 3/2019 | Jang | B60W 40/105 |
| 2019/0392664 | A1* | 12/2019 | Determann | G07C 9/00658 |
| 2021/0253066 | A1* | 8/2021 | Shirakura | B60S 1/583 |

* cited by examiner

VEHICLE WIPER AND WASHER ACTUATION SYSTEM

CROSS-REFERENCES TO RELATED APPLICATIONS

Not applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

This invention relates to the field of motor vehicles. More specifically, the invention comprises a system for remotely activating a vehicle's windshield wipers and washer system so that a user can employ them while manually cleaning the windshield.

2. Description of the Related Art

FIG. 1 depicts an exemplary motor vehicle 10. Windshield 12 is swept by two windshield wipers 14. FIG. 2 shows a detail view of the cowl area just below and forward of the windshield. Wiper arms 22 are attached to a driven rotary assembly located beneath cowl 24. The wiper arms are driven in an oscillating motion so that windshield wipers 14 are moved back and forth across windshield 12.

Nearly all modern vehicles include a supplemental spray system that is used to remove bugs and other contaminants from the windshield. In the example depicted in FIG. 2, a pair of nozzles 26 are provided in cowl 24. These are spray nozzles configured to disperse a liquid across the surface of the windshield. The nozzles are connected to a washer fluid reservoir—typically located beneath the vehicle's hood. A liquid pump pulls the washer fluid from the reservoir, pressurizes it, and propels it through the nozzles 26.

The windshield washer and wiper functions are controlled by switches within the motor vehicle. These are now commonly located on a "stalk" near the steering wheel. The switches allow the windshield wipers to be operated at various speeds and modes. Some vehicles now feature rain sensors that automatically actuate the wipers when rain falls on the windshield as well. A separate wash actuation feature is ordinarily provided. When the user actuates this feature, the nozzles 26 spray washer fluid onto the windshield and the wipers operate through a set number of cycles.

The actuating switches come in many different forms. However, all prior art types are located inside the vehicle. This arrangement makes sense because the spray nozzles and wipers are actuated while driving. However, there are circumstances where the prior art arrangement is disadvantageous. A good example is a situation here the vehicle has driven through a cloud of insects. The resulting splatter is difficult to remove from the windshield. A user often has to find a service station with a suitable scrub brush and squeegee. The user then manually scrubs the windshield to remove the contamination.

Unfortunately, a user facing such contamination does not always have access to a cleaning fluid such as provided by a service station. It would be advantageous to provide access to the vehicle's own washer fluid so that it could be used in a manual scrub cycle. The present invention provides this advantage, along with other advantages.

BRIEF SUMMARY OF THE PRESENT INVENTION

The present invention comprises a vehicle windshield wiper and washer activation system that allows the control of these devices from outside the vehicle. A remote switch or switches is provided at a convenient location, such as the side of the fender or in front of the grill. An optional wireless connection may also be provided. In the wireless embodiment, a separate actuating device such as a dedicated transmitter or smartphone is used to control the wipers and the delivery of washer fluid.

REFERENCE NUMERALS IN THE DRAWINGS

Figure 1:
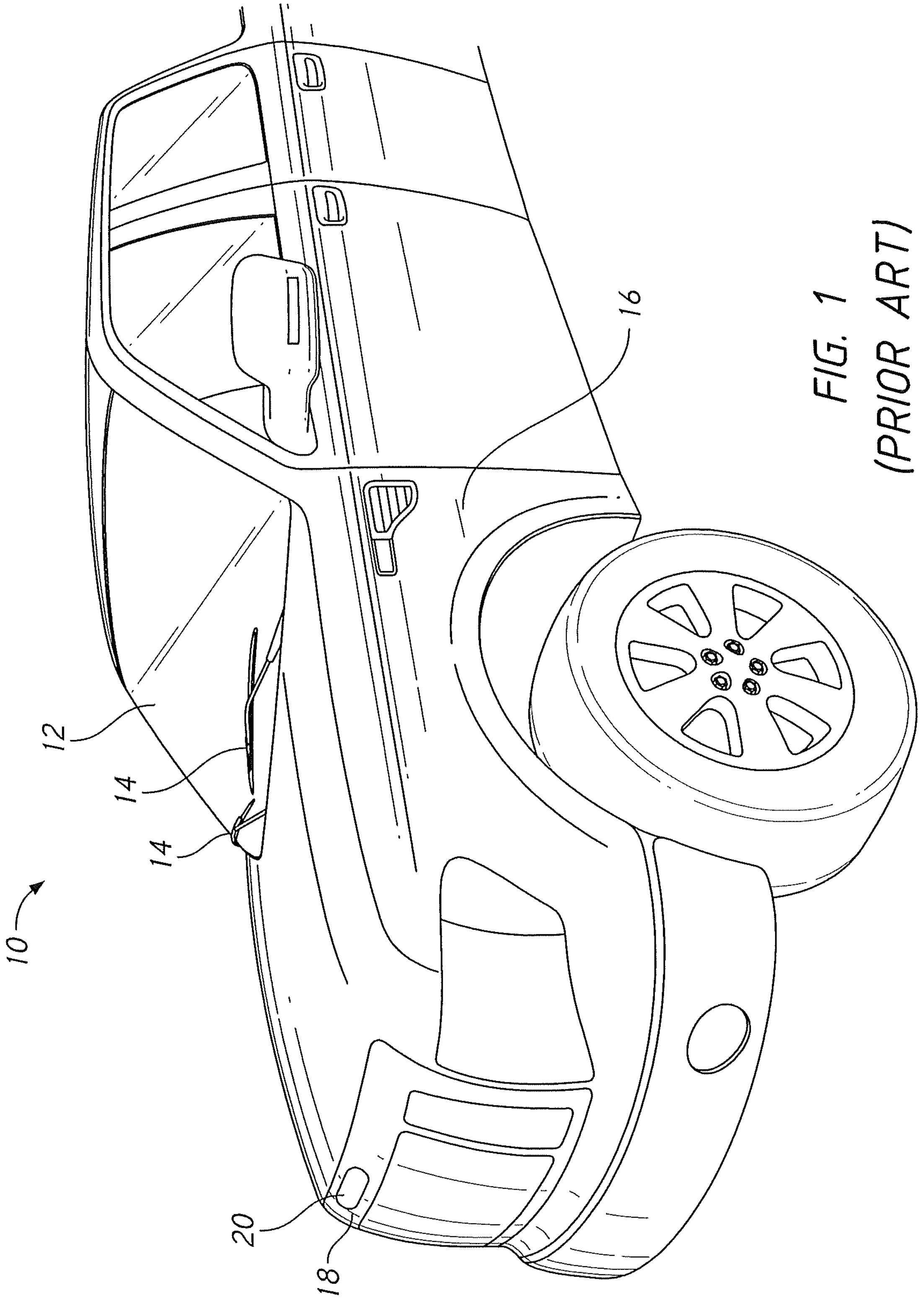
FIG. 1 (PRIOR ART)
FIG. 1 is a perspective view, showing an exemplary prior art vehicle.

10 vehicle
12 windshield
14 windshield wiper
16 fender
18 grill
20 emblem
22 wiper arm
24 cowl
26 nozzle
28 vent
30 wash button
32 wipe button
34 smartphone
36 fob
38 display/interface screen
40 graphical user interface
42 engine control unit
44 body control unit
46 engine data bus
48 body data bus
50 wiper switch assembly
52 wiper motor

54 washer pump
56 control module
58 processor
60 memory
62 CAN module
64 R/F module
66 antenna
68 power supply

DETAILED DESCRIPTION OF THE INVENTION

This description pertains to a few selected embodiments of the invention. Many more embodiments will occur to those skilled in the art and the scope of the invention is by no means limited to the examples provided. Thus, the reader should refer to the claims to ascertain the scope of the invention.

Figure 2:
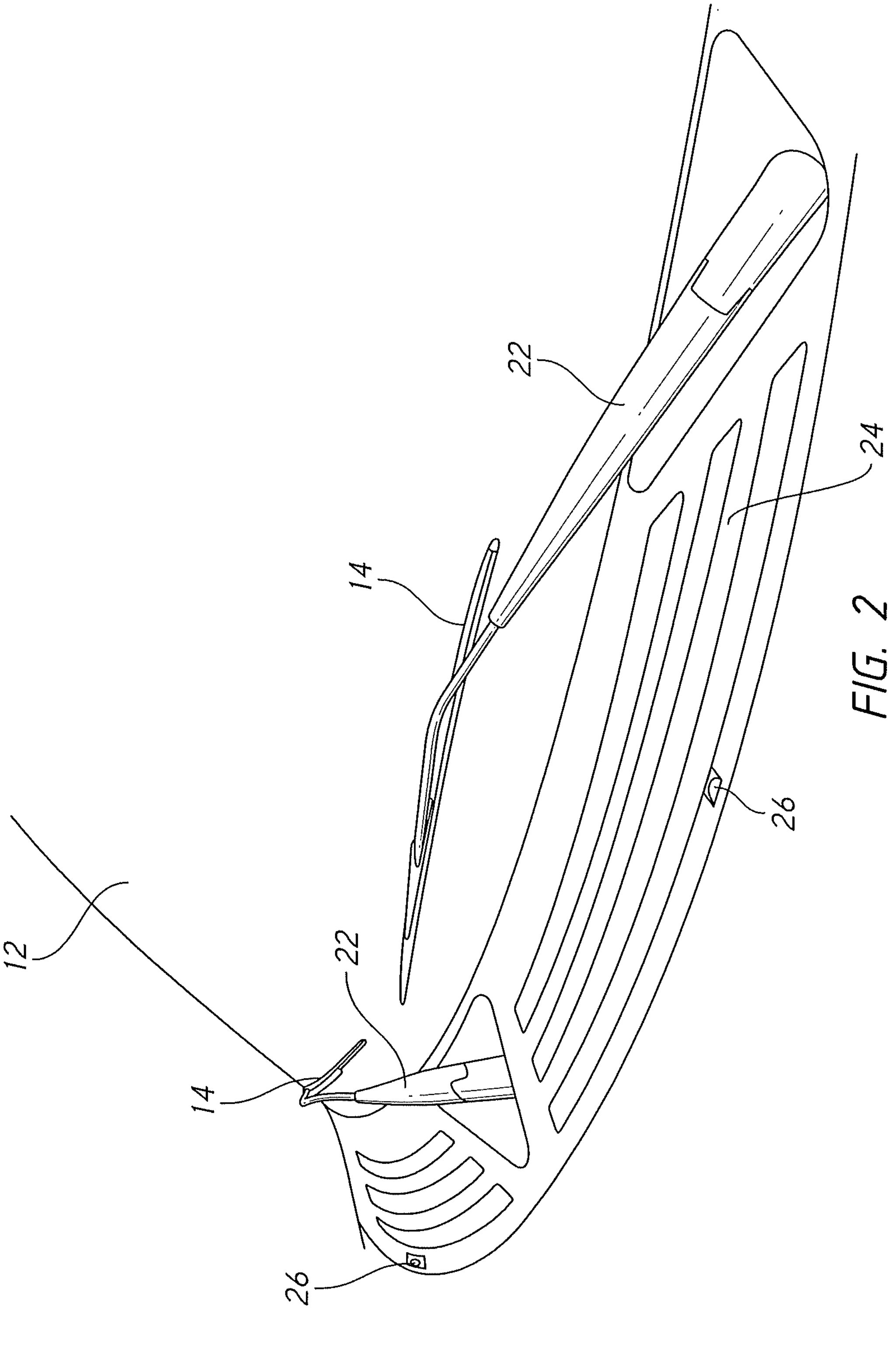
FIG. 2 (PRIOR ART)
FIG. 2 is a detailed perspective view, showing the cowl area of the vehicle in FIG. 1.

FIG. 1 depicts a relevant portion of an exemplary prior art vehicle 10. Windshield wipers 14 are positioned to wipe across the surface of windshield 12. FIG. 2 shows a more detailed view of the region just below the base of windshield 12. Wiper arms 22 are attached in the vicinity of cowl 24. The wiper arms are driven through oscillating arcs. This motion is produced in various ways. In many vehicles a crank-rocker 4-bar linkage is used to convert rotary motion from a driving gear motor to oscillating motion for the wiper arms. In other vehicles the driving motor itself is driven in forward and reverse to produce the oscillating motion.

Nearly all vehicles now include some type of windshield washer system. In the example of FIG. 2, a pair of nozzles 26 are provided in cowl 24. These nozzles are configured to spray windshield washer fluid (typically a mixture of water, other solvents, and detergents) on a broad pattern over the windshield. A reservoir within the vehicle contains the washer fluid. A pump draws the fluid from the reservoir, pressurizes it, and delivers it to nozzles 26. One or more check valves are often incorporated to prevent unwanted flow when the pump is not energized.

As described previously, the windshield wipers and windshield washer system are activated by controls inside the vehicle. Switches controlling these functions are often placed on a stalk extending from the steering column. Unfortunately, the windshield washer system may not be able to satisfactorily remove all windshield contamination. Insect remains spattered on the windshield present a common challenge.

A vehicle user may wish to manually assist in the removal of windshield contamination using a cloth, scrub brush, or squeegee. In order to do this the user has traditionally needed a separate supply of cleaning liquid. However, the action often needs to be taken when that separate supply in unavailable. The present invention allows the user to access the windshield washer fluid stored in the vehicle.

The controls provided will be described first, along with the actions of the wipers and spray nozzles that the controls produce. Thereafter, some exemplary details of the control circuitry will be described.

Figure 3:
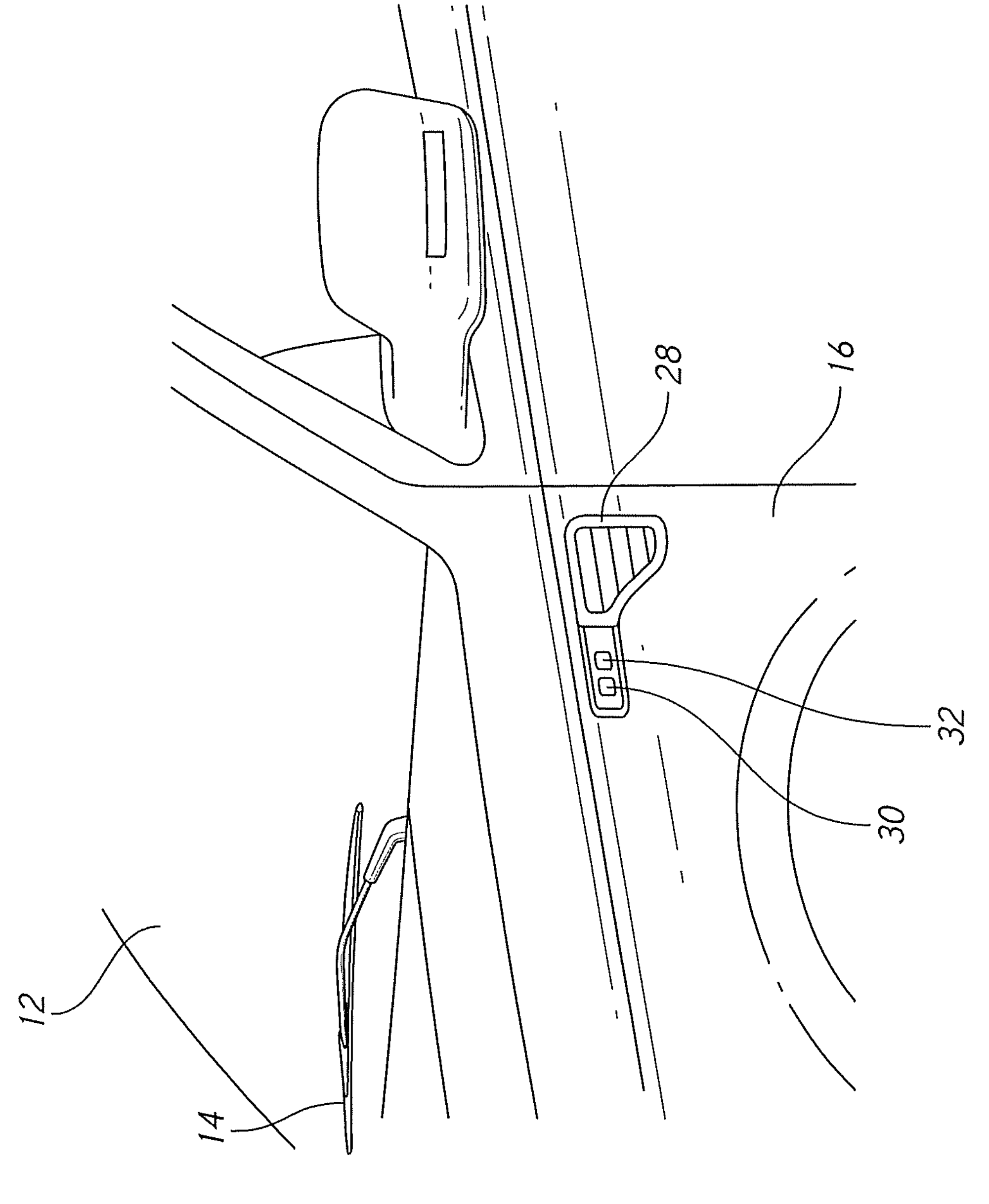
FIG. 3 is a detailed perspective view, showing the fender area of the vehicle in FIG. 1.

FIG. 3 shows the exterior of the vehicle's left side—proximate fender 16. Vent 28 is provided near the upper portion of the fender. A button panel containing wash button 30 and wipe button 32 is provided just forward of the vent. When the user presses wash button 30, the nozzles 26 spray windshield washer fluid on the windshield. The spray can be set to continue for a fixed duration—such as 3 seconds. Alternatively, the spray can continue for as long as wash button 30 is pressed.

Once windshield 12 is wetted with the washing fluid, the user can manually apply a scrub brush or other device to scrub the windshield. When the user is finished, pressing wipe button 32 activates the windshield wipers. The wipers can be set to wipe for a fixed duration of time, or they can continue for as long as wipe button 32 is pressed.

Optionally, a delay can be added between the pressing of wipe button 32 and the start of windshield wiper motion. This is because the windshield wipers may sling both fluid and debris near the position the user occupies when actuating the wipe button. A delay allows the user to press the wipe button and move a few feet away before the wiper motion begins. A delay function can be added to the wash button as well.

Figure 4:
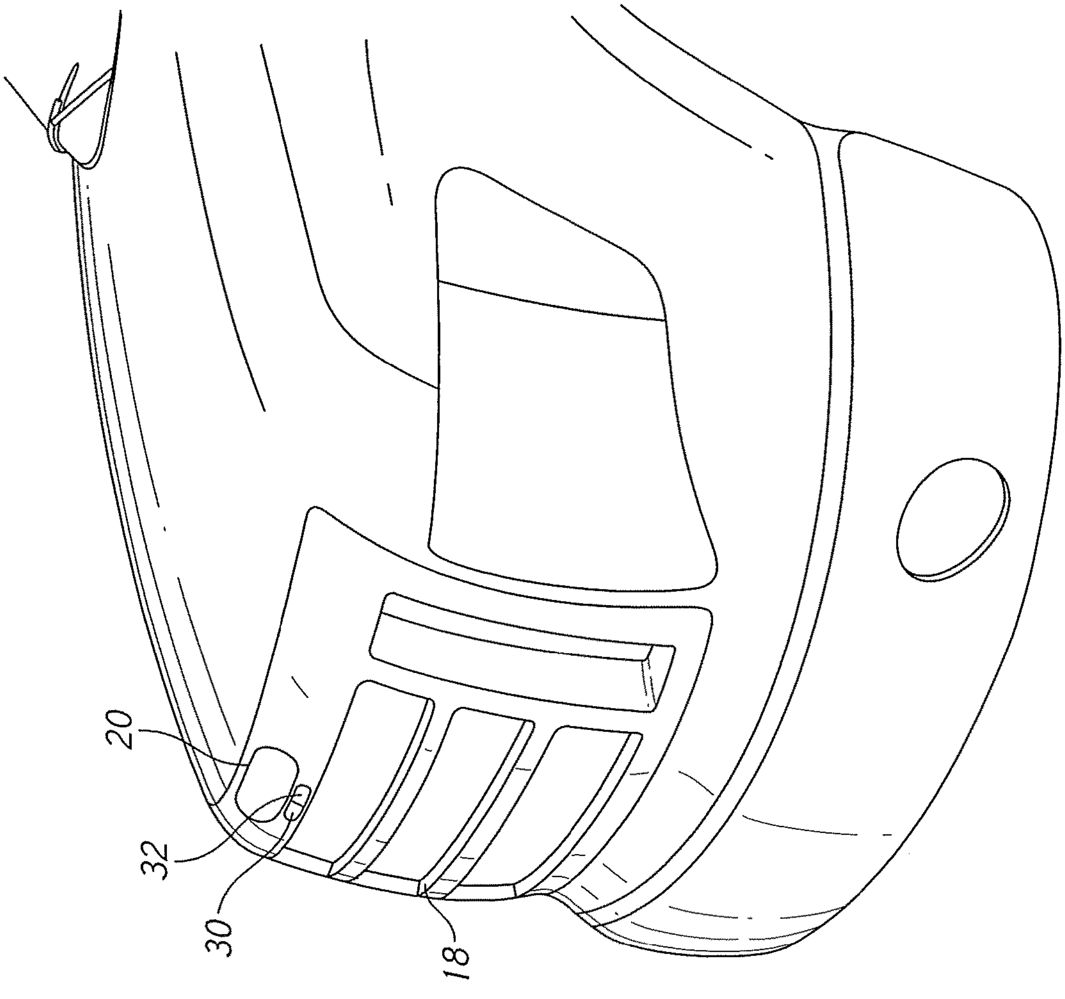
FIG. 4 is a detailed perspective view, showing the grille area of the vehicle in FIG. 1.

Of course, the buttons can be placed in many different locations around the exterior of the vehicle. FIG. 4 shows an alternate embodiment in which wash button 30 and wipe button 32 are placed proximate emblem 20 on the vehicle grille 18. In still other embodiments the wash button and wipe button can be placed in different locations. As an example, the wash button could be located on the cowl itself and the wipe button in the location shown in FIG. 4.

The exterior wash and wipe buttons are only intended to be used by an authorized operator. Thus, it is advantageous to prevent their operation by unauthorized persons. This goal can be achieved in a variety of ways. In a first way, radio detection is used to ensure that the exterior buttons only function when in close proximity to the vehicle's key fob. This technology is used for keyless start/stop systems and keyless entry systems. A transceiver and antenna is provided proximate the location of the exterior buttons. When a button is pressed, the transceiver transmits an encoded signal. The signal is received by the key fob and the key fob then sends a reply signal. When the transceiver receives the reply signal from the key fob the software assumes that the key fob is proximate the external buttons and that the operation is therefore one desired by an authorized operator. The wash and wipe operations are therefore allowed. Conversely, if no reply signal is received from a key fob, then the system does not actuate the wash or wipe functions.

Figure 5:
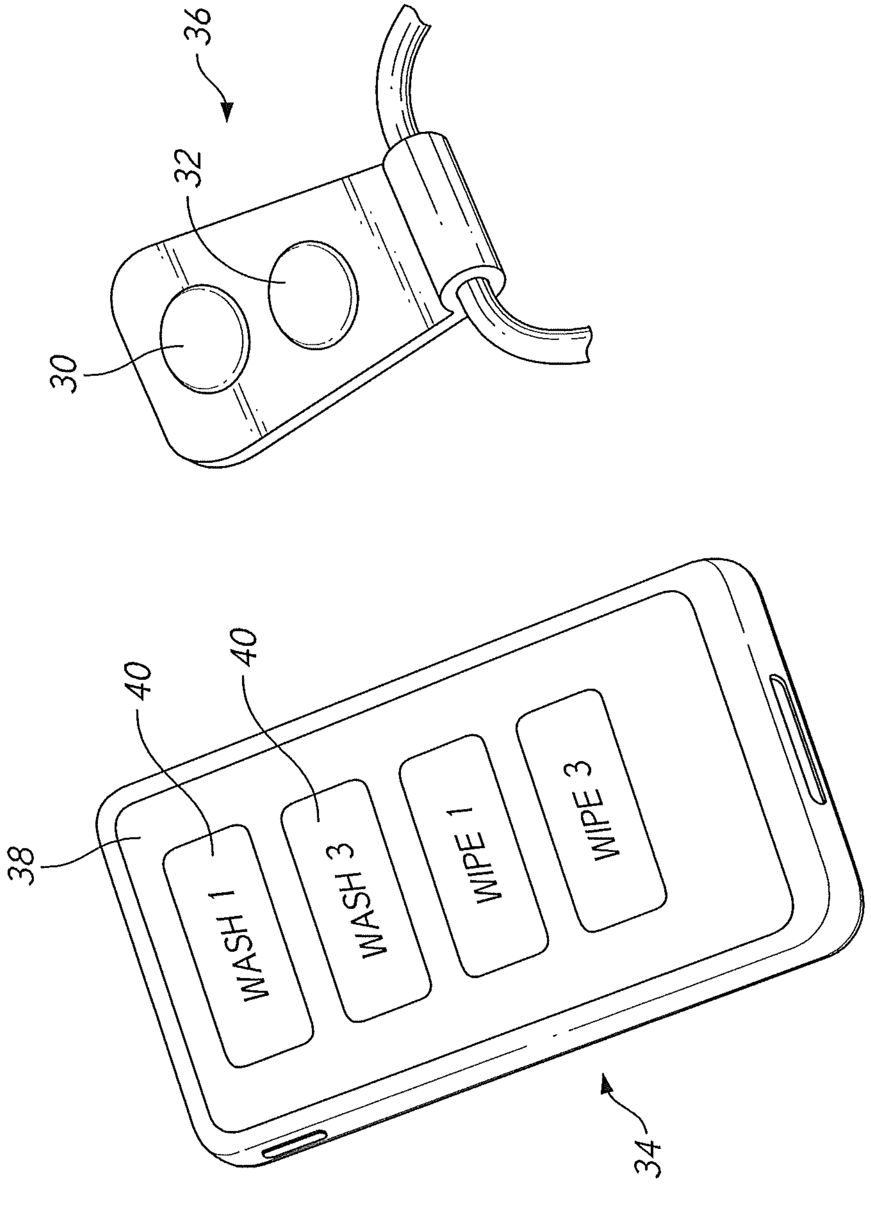
FIG. 5 is a perspective view, showing two exemplary remote-control devices that can be used with the present invention.

The wash and wipe buttons do not have to be mounted to the vehicle. FIG. 5 shows two embodiments where they are not mounted to the vehicle. Fob 36 is a small device that can be attached to a key chain. Wash button 30 and wipe button 32 are included on the fob. Pressing one of the buttons sends a radio signal to a receiving unit in the vehicle—the operation of which will be described subsequently.

The actuating devices for the wash and wipe functions do not have to be physical buttons. FIG. 5 shows yet another embodiment in which the wash and wipe buttons are presented as virtual icons on a smartphone 34. Smartphone 34 includes a display/interface screen 38. Graphical user interface 40 is presented on this display. If a user touches the screen within one of the graphically depicted buttons, the device will interpret the touch as a selection. An appropriate signal will then be sent (via radio) to a receiver within the vehicle.

The use of virtual buttons allows many more options. In this example, the "WASH 1" button activates the spray nozzles for 1 second. The "WIPE 1" button activates the wipers for 1 cycle. The "WASH 3" button activated the spray nozzles for 3 seconds. The "WIPE 3" button activates the wipers for 3 cycles. Additional virtual buttons can be provided for other options. Sliders or dials allowing more variations can also be provided.

The control circuitry needed to actuate the spray nozzles and the wipers can assume many forms. This is particularly true where the invention is included in the vehicle by the original equipment manufacturer ("OEM"). The examples described hereafter could be part of an OEM system or an aftermarket system.

Until recent times the control of component with a vehicle was implemented using discrete circuits. For example, a seat control switch simply "made" the power circuit to a motor driving the relevant portion of the seat for as long as the switch was closed. Other switches controlled the low-current side of a relay, but the principle of operation was essentially the same. More complex switches were used for such devices as power mirrors, but the principle of operation was again the same for these devices as well. This is no longer the case, however, as the control of automotive components is rapidly shifting to the digital domain.

The general implementation of digital control uses a data bus distributed throughout the vehicle. The data bus sends digital messages (such as the state of a controlling switch) that may be received by any component connected to the bus. The data bus does not provide electrical power to the actuating components such as a seat motor (though it may supply some low-level power to other devices). Power is supplied separately to the actuating components through a power distribution harness.

As far as the user is concerned, the new digital paradigm often appears to function just like the old analog paradigm. As an example, if the user wishes to roll down a window, he or she still presses a designated button, and the window rolls down. However, the button is not "making" an analog circuit and is not serving as part of the path for the electrical current driving the window motor. Instead, both the button and the motor are hooked up to a data bus, and the data bus is likely hooked up to a controlling microprocessor (sometimes called a "Body Control Unit"). The switch sends a digital message specifying its identity and the fact that the switch is in an "ON" state. The Body Control Unit receives and interprets this message, then makes an appropriate response. In response to the window control button being placed in the "ON" position, the body control unit sends a digital message to the appropriate window motor instructing it to move the window. The window motor has an associated controller that receives and decodes this digital instruction. Power electronics within the window controller then activate a driving motor to move the window.

While the digital approach sounds complicated, it is in many instances much more efficient to install and run than a traditional system. Rather than routing dedicated wiring harnesses from switches to the components they control, the digital approach allows the vehicle manufacturer to provide a single data harness and only a few power harnesses. New components may also be added without the need to add additional wiring.

The first widely-used system implementing the digital paradigm was developed by Robert Bosch, GmbH in the early 1980's. Bosch called its system the "CAN bus," where "CAN" stands for "Controller Area Network." Bosch actually released its protocol to the Society of Automotive Engineers with the initial hope of creating a unified communication platform across all vehicles makes and models, though Bosch did not propose to offer the standard free of licensing fees.

The goal of a uniform standard has largely gone unrealized, with the various vehicle manufacturers adopting proprietary systems instead. Even so, the general characteristics of the original CAN standard are found in most vehicle operating protocols. In general, a CAN network is a "masterless" system in which various microcontrollers communicate without the need for one defined "host" computer. This is a significant feature, as a modern vehicle may contain as many as 70 separate electronic control units. The two most significant control units are typically the Engine Control Unit ("ECU") and the aforementioned Body Control Unit ("BCU"). However, as discussed in the preceding example, each individual window motor is likely to have a separate controller. Other controllers may be provided for the windshield wipers, the washer fluid spray system, a blower fan, an air conditioning compressor, power mirrors, air bags, air-inflated suspension "springs," an automatic transmission, and even small things like the dimming functions of a rear-view mirror.

Figure 6:
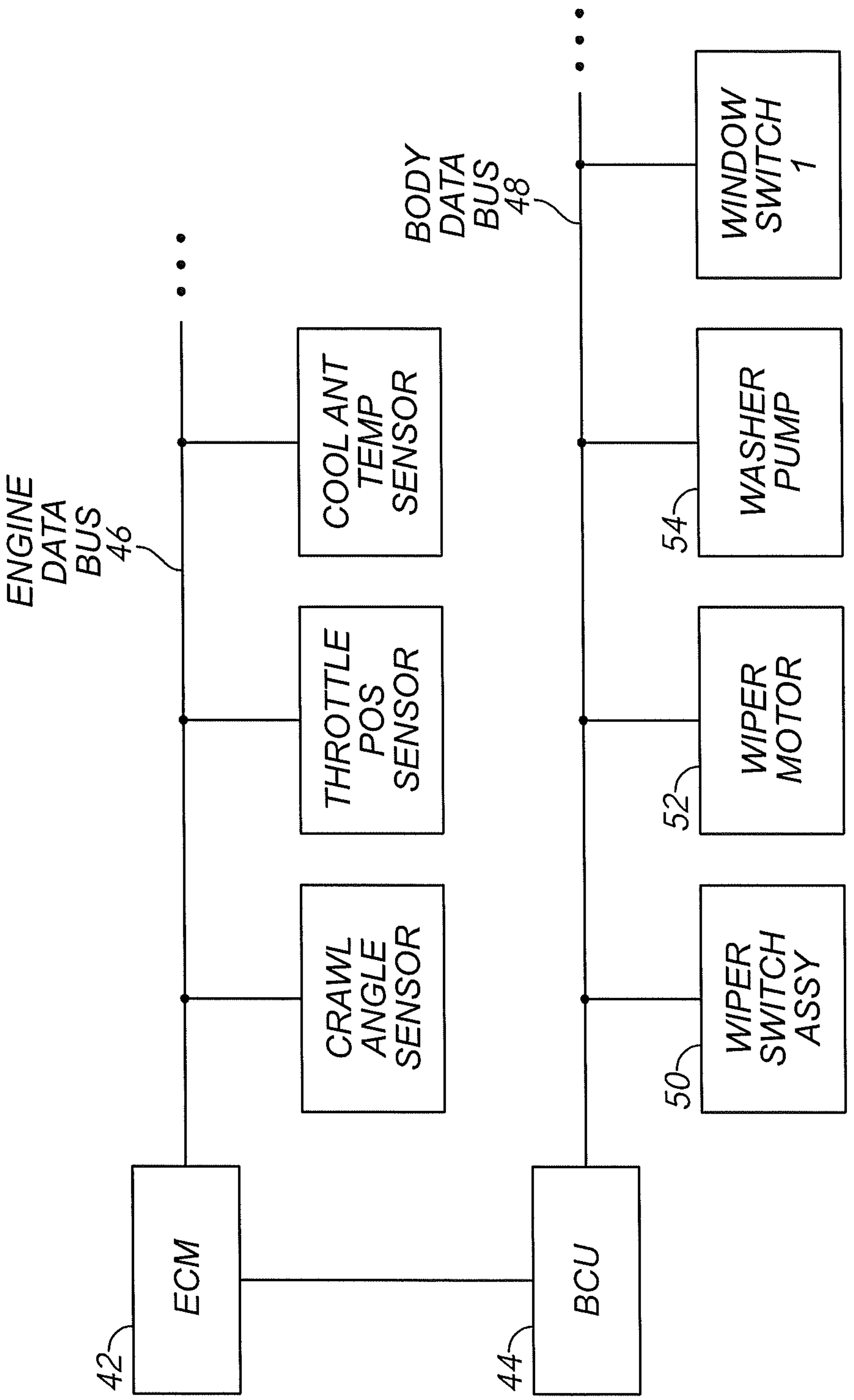
FIG. 6 (PRIOR ART)
FIG. 6 is a block diagram, showing exemplary prior art vehicle data buses.

FIG. 6 shows a simplified block diagram of communication buses within a vehicle. Engine control unit 42 is connected to engine data bus 46. Numerous engine sensors and actuators interact with this bus. Body control unit 44 sends and receives data over body data bus 48 (The ECU and BCU are also often connected by a separate bus). Body data bus 48 provides communication for wiper switch assembly 50 (a multi-switch stalk in this example), wiper motor 52, washer pump 54, and many other device.

Figure 7:
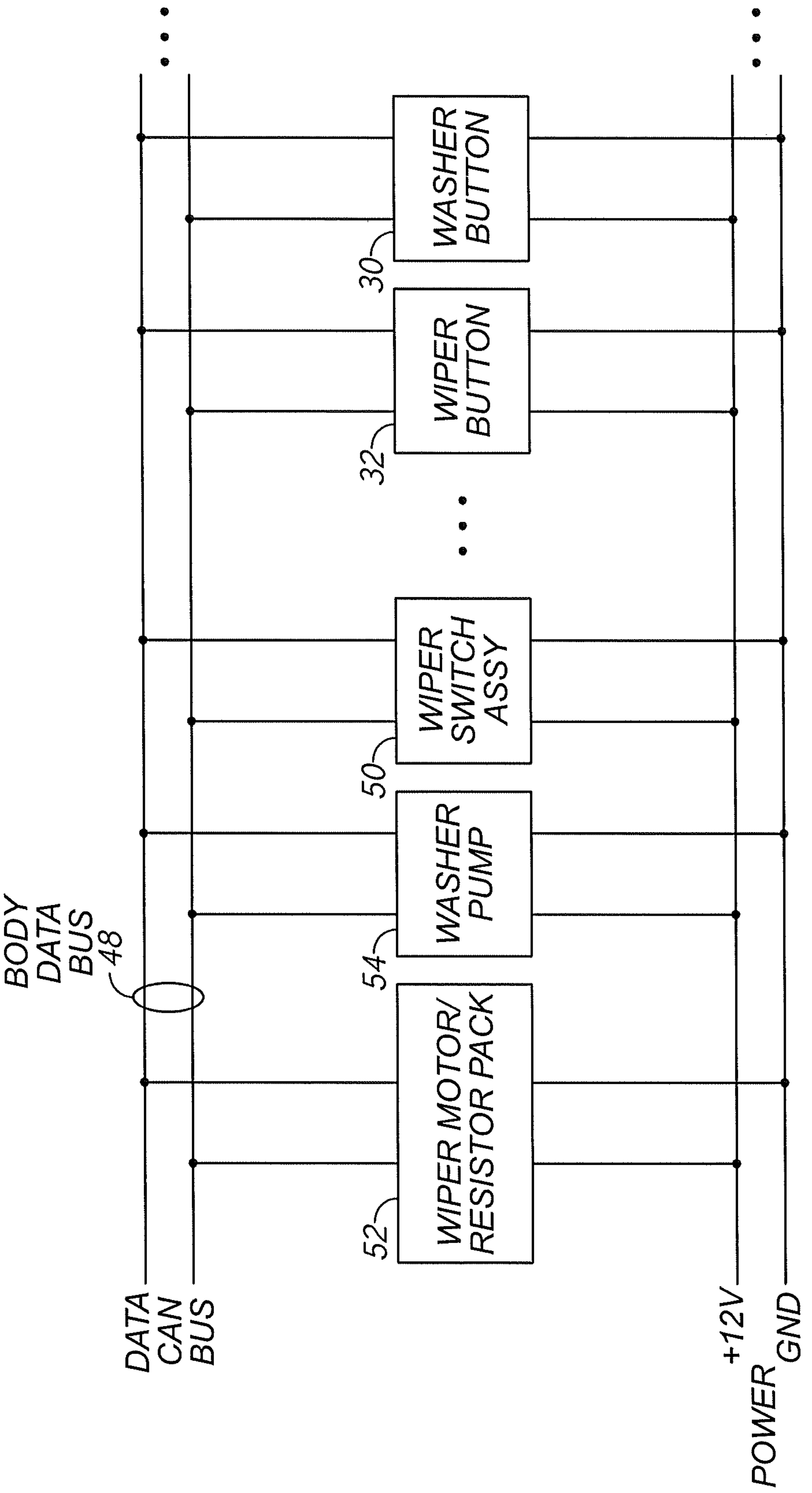
FIG. 7 is a block diagram, showing the incorporation of the present invention into a vehicle data bus.

FIG. 7 depicts the structure of body data bus 48—a CAN type bus. A CAN bus is typically just a twisted-pair (two conductors twisted around a common axis to help cancel unwanted emissions). However, although no universal CAN standard for connectors has evolved, it is common to include the CAN pair in a four-wire cable. The four-wire cable carries CAN−, CAN+, Power Voltage, and Ground. Using this 4-wire bundle means that a single connector allows the simultaneous connection of a component to the control bus and the power distribution bus.

Many items connected to the CAN bus include a controller and internal digital signal processing. Wiper motor/resistor pack 52—as an example—includes an internal processor and switching circuitry. The processor decodes CAN bus messages to determine when the wiper motor is to be engaged. The internal switching circuitry switches in one or more resistors in a resistor pack in order to set the speed of operation. Additional data messages may set the mode of operation for the wiper motor (such as s single sweep or intermittent operation).

Washer pump 54 is typically just a simple on/off device. Even so, it still includes a digital decoder that can decode a digital message commanding its operation. Wiper switch assembly 50 includes all the normal OEM controls for operating the windshield wipers and the wash system. In this example the switch assembly includes an on-board controller that interprets the closure of one or more switches and creates a digital data signal reflecting that fact.

The system shown is a peer-to-peer or "masterless" system (other types exist). In this implementation wiper switch assembly 50 places a digital signal on the CAN bus and wiper motor 52 and/or washer pump 54 responds to that digital signal. There is no need for separate processing through a Body Control Unit. In other systems a BCU acts as a "master", and it generates commands in response to messages sent by other controllers.

FIG. 7 shows how washer switch 30 and wiper switch 32 have been added to this data bus. If an OEM installation, then a connector can be provided, and the switches are simply plugged in during the manufacturing process. If an aftermarket component, a wiring harness will likely be needed for the buttons 30, 32. This wiring harness runs from the buttons to a location that is convenient for tapping into the CAN/power bus. The connections are parallel connections, which can easily be made with existing splice connectors.

Once connected, when a user pressed washer button 30, a controller within the module continuing washer button 30 generates a digital signal and places it on body data bus. That signal commands the washer pump to run. Washer pump 54 receives this signal and operates. The controller within washer pump 54 does not distinguish between such a signal coming from wiper switch assembly 50 and one coming from washer button 30. They are the same digital signal. In most systems, a command is sent to turn a component on, and a second command is later sent to turn it off. Thus, the controller within washer button 30 will generate two digital commands.

Wiper button 32 also contains a controller that generates a digital command when it is pressed. Of course, if the washer button 30 and the wiper button 32 are located close together, using a single controller for both is advantageous.

Figure 8:
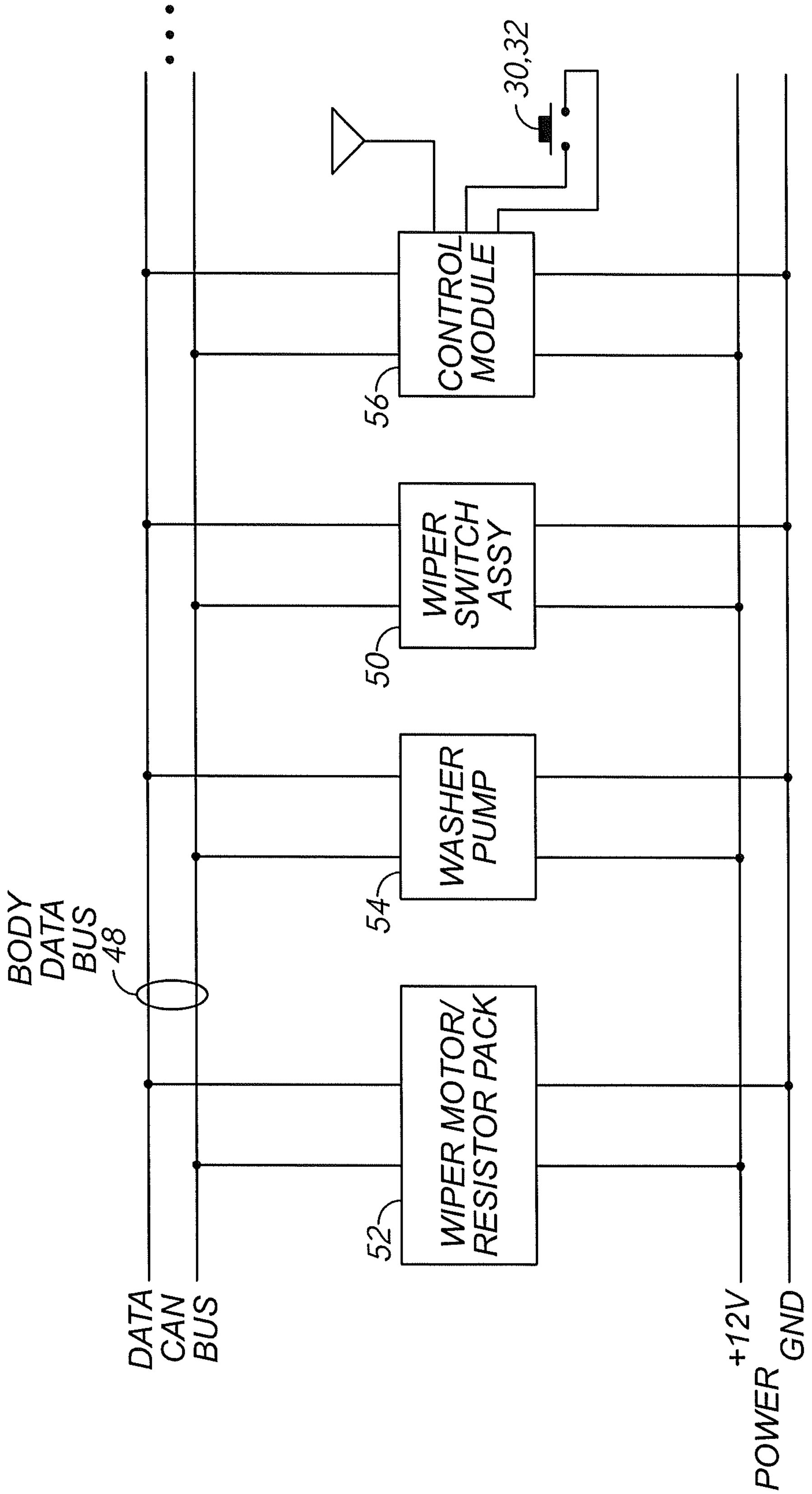
FIG. 8 is a block diagram, showing the incorporation of the present invention into a vehicle data bus.
Figure 9:
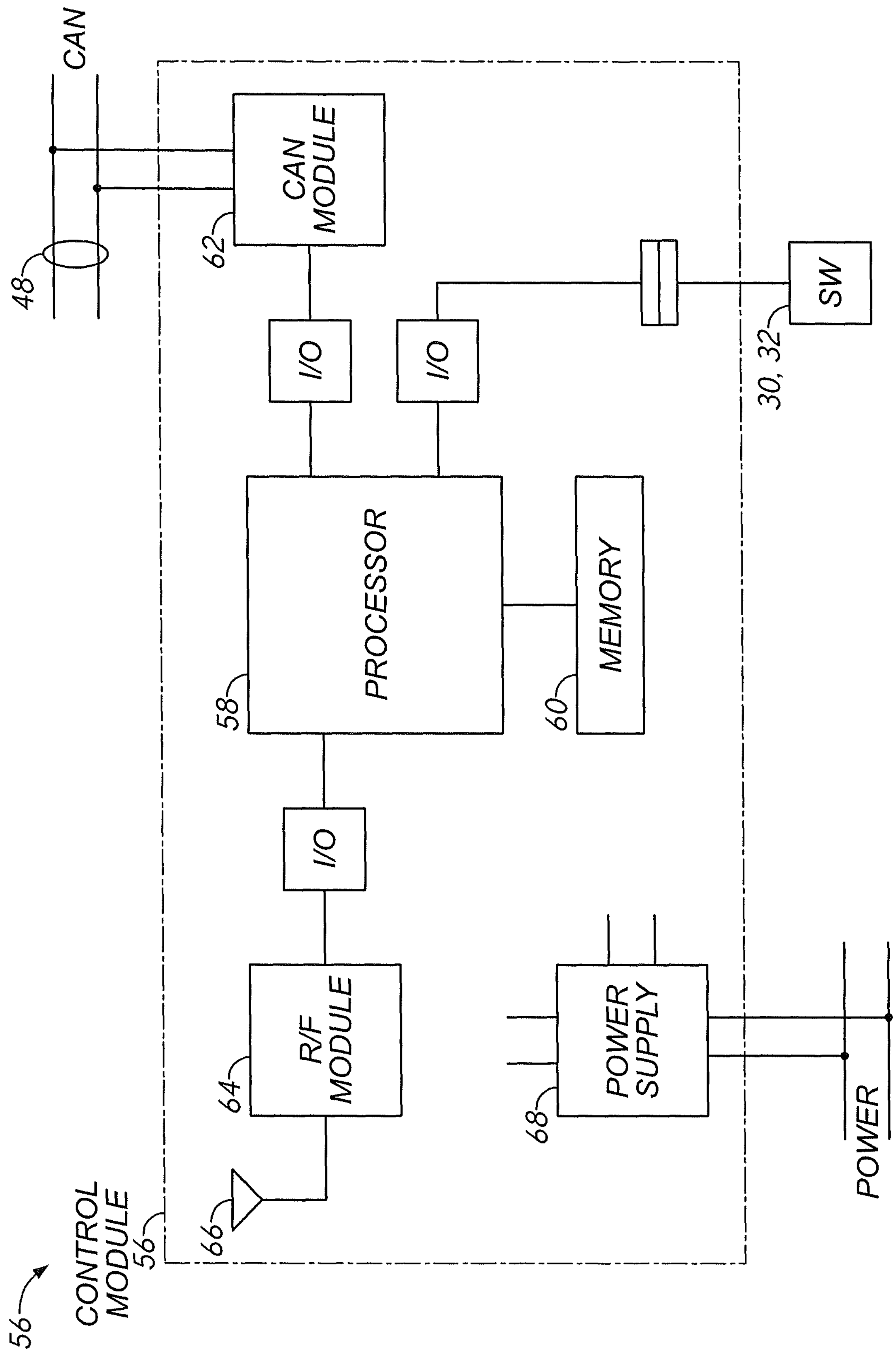
FIG. 9 is a block diagram, showing a processor-based implementation of the present invention.

FIGS. 8 and 9 show anther embodiment in which control module 56 is installed on body data bus 48. Control module 56 includes a wireless receiver configured to receive externally generated wireless signals—such as from the fob 36 or smartphone 34 shown in FIG. 5. Control module 56 receives these signals and acts on them by creating an appropriate digital command and placing it on body data bus 48. As an example, if control module 56 receives a signal indicating that the user has pressed the "WASH 1" button on the GUI of the smartphone, control module 56 creates a "WASHER PUMP: ON" signal and places it on body data bus 48. One second later control module 56 generates a "WASHER PUMP: OFF" signal and places it on data bus 48.

Control module 56 also has inputs for a hardwired embodiment of switches 30, 32. Thus, control module 56 allows for dual inputs—the user can for instance press a button on the fender or tap a GUI icon on a smartphone.

FIG. 9 shows exemplary internal details for control module 56. Processor 58 runs software retrieved from associated memory 60. The processor includes a number of Input/Output modules. CAN module 62 is a dedicated CAN interface. It retrieves CAN messages and decodes them before sending them to the processor. It also receives processor messages and puts them in a CAN format before placing them on a CAN bus.

A second I/O port provides an interface for the optional attached switches 30, 32. In this example, the switch interface allows a switch actuation to pull a designated processor pin to ground—thereby indicating to the processor that the user has pressed one of the buttons 30 or 32.

A third I/O port provides access to R/F module 64. This module receives external radio signals (such as from the fob, the smartphone, or some other device) and decodes them. It then generates a command signal for the processor. R/F module 64 can operate in any suitable format, such as ZIGBEE or BLUETOOTH. BLUETOOTH is preferred for interaction with external computing devices like smartphone 34.

Finally, power supply 68 takes in power from the 12V bus and conditions it for use in powering the other components within the control module. The connections from the power supply to the various components are not shown for purposes of visual simplicity.

The term "portable computing device" in this disclosure is intended to mean a cellular phone, a smart phone, a tablet, or other device capable of sending wireless transmissions. The term "dedicated radio transmission device" is intended to mean a device such as a remote-control fob.

The preceding descriptions contain significant detail regarding the novel aspects of the present invention. They should not be construed, however, as limiting the scope of the invention but rather as providing illustrations of the preferred embodiments of the invention. Many other embodiments will occur to those skilled in the art. Thus, the scope of the invention should be fixed by the claims ultimately drafted, rather than by the examples given.

Having described my invention, I claim:

1. A system for selectively activating a windshield wiper and a windshield washer in a motor vehicle, comprising:

(a) a wipe button configured to selectively activate said windshield wiper, said wipe button being located outside said motor vehicle and being permanently attached to said motor vehicle;

(b) a wash button configured to selectively activate said windshield washer, said wash button being located outside said motor vehicle and being permanently attached to said motor vehicle;

(c) a vehicle key fob;

(d) a control module in communication with said wipe button and said wash button;

(e) a wireless communication link between said vehicle key fob and said control module;

(f) said control module only activating said windshield wiper when said wipe button is pressed and said control module detects said vehicle key fob using said wireless communication link; and (g) said control module only activating said windshield washer when said wash button is pressed and said control module detects said vehicle key fob using said wireless communication link.

2. The system for selectively activating a windshield wiper and a windshield washer in a motor vehicle as recited in claim 1, wherein said wipe button and said wash button are located on a side of said motor vehicle.

3. The system for selectively activating a windshield wiper and a windshield washer in a motor vehicle as recited in claim 2, comprising:

(a) wherein communication between components within said vehicle takes place over a data bus; and (b) said control module communicates with said wipe button and said wash button over said data bus.

4. The system for selectively activating a windshield wiper and a windshield washer in a motor vehicle as recited in claim 1, wherein said wipe button and said wash button are located on a front of said motor vehicle.

5. The system for selectively activating a windshield wiper and a windshield washer in a motor vehicle as recited in claim 4, comprising:

(a) wherein communication between components within said vehicle takes place over a data bus; and (b) said control module communicates with said wipe button and said wash button over said data bus.

6. The system for selectively activating a windshield wiper and a windshield washer in a motor vehicle as recited in claim 1, comprising:

(a) wherein communication between components within said vehicle takes place over a data bus; and (b) said control module is in communication with said data bus, said wipe button, and said wash button.

7. The system for selectively activating a windshield wiper and a windshield washer in a motor vehicle as recited in claim 6, wherein said control module incorporates a delay function configured to delay an actuation of said windshield wiper after said wipe button is actuated.

8. The system for selectively activating a windshield wiper and a windshield washer in a motor vehicle as recited in claim 6, wherein:

(a) said control module includes a radio frequency receiver; and (b) said control module communicates with said key fob via radio transmissions.

9. The system for selectively activating a windshield wiper and a windshield washer in a motor vehicle as recited in claim 8, wherein said control module communicates with other components within said vehicle using a CAN bus.

10. A system for selectively activating a windshield washer in a motor vehicle, comprising;

(a) a wash button configured to selectively activate said windshield washer, said wash button being located outside said motor vehicle and being permanently attached to said motor vehicle;

(b) a vehicle key fob;

(c) a control module in communication with said wash button;

(d) a wireless communication link between said vehicle key fob and said motor vehicle; and (e) said wash button activating said windshield washer only when said wash button is pressed and said key fob is in communication with said motor vehicle.

11. The system for selectively activating a windshield washer in a motor vehicle as recited in claim 10, wherein said wash button is located on a side of said motor vehicle.

12. The system for selectively activating a windshield washer in a motor vehicle as recited in claim 10, wherein said wash button is located on a front of said motor vehicle.

13. The system for selectively activating a windshield washer in a motor vehicle as recited in claim 10, comprising:

(a) wherein communication between components within said vehicle takes place over a data bus; and (b) said control module is in communication with said data bus and said wash button.

14. The system for selectively activating a windshield washer in a motor vehicle as recited in claim 13, wherein said control module incorporates a delay function configured to delay an actuation of said windshield washer after said wash button is actuated.

15. The system for selectively activating a windshield washer in a motor vehicle as recited in claim 13, wherein:

(a) said control module includes a radio frequency receiver; and (b) said control module communicates with said key fob via radio transmissions.

16. The system for selectively activating a windshield washer in a motor vehicle as recited in claim 15, wherein said control module communicates with other components within said vehicle using a CAN bus.

17. The system for selectively activating a windshield washer in a motor vehicle as recited in claim 16, wherein said windshield washer is controlled using said CAN bus.

18. A system for selectively activating a windshield wiper in a motor vehicle, comprising;

(a) a wipe button configured to selectively activate said windshield wiper, said wipe button being located outside said motor vehicle and being permanently attached to said motor vehicle;

(b) a vehicle key fob;

(c) a control module in communication with said wipe button;

(d) a wireless communication link between said vehicle key fob and said motor vehicle; and (e) said wipe button activating said windshield wiper only when said wipe button is pressed and said key fob is in communication with said motor vehicle.

19. The system for selectively activating a windshield washer in a motor vehicle as recited in claim 18, wherein said wash button is located on a side of said motor vehicle.

* * * * *